United States Patent Office 3,592,934
Patented July 13, 1971

3,592,934
PHARMACEUTICAL COMPOSITIONS AND METHODS OF CONTROLLING INFLUENZA A VIRUS INFECTION UTILIZING SUBSTITUTED ADAMANTANES AND TRICYCLO[4.3.1.1$^{3.8}$] UNDECANES
William W. Prichard, Hockessin, Del., assignor to E. I. du Pont de Nemours and Company, Wilmington, Del.
No Drawing. Continuation-in-part of application Ser. No. 673,938, Oct. 9, 1967, which is a division of application Ser. No. 376,259, June 18, 1964, which in turn is a continuation-in-part of application Ser. No. 297,233, July 24, 1963. This application June 20, 1969, Ser. No. 835,232
Int. Cl. A61k 27/00
U.S. Cl. 424—325
10 Claims

ABSTRACT OF THE DISCLOSURE

This invention relates to pharmaceutical compositions containing a compound of a class of adamantane and tricyclo[4.3.1.1.$^{3.8}$]undecane compounds having an aminomethyl or N-substituted aminomethyl group attached to a tertiary or bridgehead nuclear carbon atom as well as the pharmaceutically acceptable salts of said class of compounds and to the use of such compositions to control influenza virus infections in warm-blooded animals. Typical compounds useful as the active ingredient in these compositions are 1-(aminomethyl)adamantane, 3-(aminomethyl)tricyclo[4.3.1.1$^{3.8}$]undecane, α - methyl-1 - adamantanemethylamine, 1 - (N-methylaminomethyl) adamantane, and the hydrochloride salts of the foregoing named compounds.

CROSS-REFERENCE

This application is a continuation-in-part of my copending application S.N. 673,938, filed Oct. 9, 1967, now abandoned, which in turn is a division of my co-pending application S.N. 376,259, filed June 18, 1964, and issued Nov. 14, 1967 as Pat. No. 3,352,912, which in turn is a continuation-in-part of application S.N. 297,233, filed July 24, 1963, and now abandoned.

According to the present invention, I have discovered a class of novel compounds having pharmaceutical application and useful as anti-influenza agents. They have the ability to inhibit and deter incidence and growth of harmful influenza viruses in warm-blooded animals. Additionally, compounds of this class of compounds exhibit significant stimulant activity.

Compounds useful for the pharmaceutical compositions and methods of the invention are those of the formula

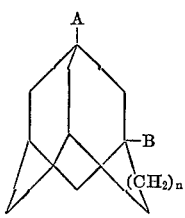

where
$n$ is 0 or 1 with the proviso that when $n$ is 0,
A is

and A is hydrogen, and
B is

and A is hydrogen, and
wherein
X and Y are each hydrogen, methyl, or ethyl; and
R is

where $m$ is an integer of from 2 through 6; —NR$_1$R$_2$; or —N=CHR$_3$ wherein
R$_1$ is hydrogen; alkyl of 1 through 6 carbon atoms; monosubstituted alkyl of 1 through 6 carbon atoms where the substituent is hydroxy, alkoxy of 1 through 2 carbon atoms, —NH$_2$, —NHR$_4$, or —NR$_4$R$_5$ and where R$_4$ and R$_5$ are each alkyl or 1 through 4 carbon atoms; alkenyl of 2 through 6 carbon atoms; alkylnyl of 2 through 6 carbon atoms; cyclopropyl; cyclobutyl; cyclopropylmethyl; or cyclobutylmethyl;
R$_2$ is R$_1$; chlorine; bromine; formyl; —CH$_2$COOH; —CH$_2$COOCH$_3$; or —CH$_2$COOC$_2$H$_5$ with the proviso that when R$_1$ is alkenyl or alkynyl having the unsaturated bond in the 1-position, R$_2$ is alkyl of 1 through 6 carbon atoms or mono-substituted alkyl of 1 through 6 carbon atoms where the substituent is hydroxy, alkoxy of 1 through 2 carbon atoms, —NH$_2$, —NHR$_4$, or —NR$_4$R$_5$; and
R$_3$ is hydrogen, alkyl of 1 through 5 carbon atoms, phenyl, naphthyl or furyl.

Included in the general formula above are adamantanes of the formula
(1)

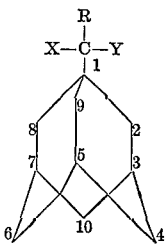

and tricyclo[4.3.1.1$^{3.8}$]undecanes of the formula
(2)

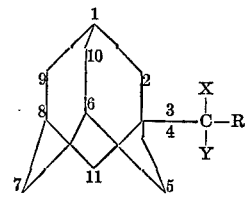

where X, Y, and R are defined as above.

Compounds hydrolyzable to the compounds of Formulas 1 and 2 are for most purposes equivalent to those compounds and are of course contemplated as within the present invention.

It also will be understood that the compounds within the scope of Formulas 1 and 2 having a basic amino group, readily form salts and such salts having a non-toxic anion are also included within the scope of the present invention. Representative of such salts are hydrochlorides, hydrobromides sulfates, phosphates, acetates, succinates, adipates, propionates, tartrates, citrates, bicarbonates, pamoates, cyclohexylsulfamates and acetylsalicylates. Of these the hydrochlorides, acetates and cyclohexylsulfamates are preferred. The cyclohexylsulfamates have a pleasant taste and thus are particularly useful in preparing syrups for oral administration. Additionally the cyclohexylsulfamates have usefulness in making uncoated tablets for oral administration which have no objectionable bitter taste. Other salts include those with caprochlorone and with penicillin. In general, the salts described above enhance the usefulness of the relatively insoluble amines in pharmaceutical applications.

Accordingly, compounds of the invention are preferred where the amine on the adamantane or undecane moiety is substituted with dialkyl (N,N,-dialkylated compounds) because they provide a very favorable balance of anti-influenza activity with reduced stimulant activity. Of these, the lower alkyl substituents such as the dimethyl and diethyl derivatives are most preferred from considerations of higher anti-influenza activity. Compounds of the invention where the amine on the adamantane or undecane moiety is monoalkylated also demonstrate reduced stimulant activity in comparison to unsubstituted amine. These monoalkylated amine derivatives do not reduce stimulant activity to the degree of the dialkylated amine derivatives but the monoalkylated amine derivatives, particularly the monomethyl and monoethyl derivatives, exhibit higher anti-influenza activity than the dialkylated amine derivatives.

Preferred compounds of the invention from the standpoint of a balance of anti-influenza activity and favorable drug dynamics, chiefly longer acting prior to degradation or excretion, are those where the methylamino group on the adamantane or undecane moiety is $\alpha$-substituted or $\alpha,\alpha$-substituted. Generally within this class of compounds, the $\alpha$-substituted compounds exhibit higher anti-influenza activity but less favorable drug dynamics in comparison to the $\alpha,\alpha$-substituted compounds.

In view of the foregoing considerations, the most preferred compounds of the invention for pharmaceutical application are the following compounds and their hydrochloride salts:

1-(N,N-dimethylaminomethyl)adamantane
1-(N-methylaminomethyl)adamantane
1-(N-ethyl-N-methylaminomethyl)adamantane
1-(aminomethyl)adamantane
1-(N,N-diethylaminomethyl)adamantane
1-(N-ethylaminomethyl)adamantane
3-(N,N-dimethylaminomethyl)tricyclo[4.3.1.1$^{3.8}$] undecane
3-(N-methylaminomethyl)tricyclo[4.3.1.1$^{3.8}$]undecane
3-(N-ethyl-N-methylaminomethyl)tricyclo[4.3.1.1$^{3.8}$] undecane
3-(aminomethyl)tricyclo[4.3.1.1$^{3.8}$]undecane
3-(N,N-diethylaminomethyl)tricyclo[4.3.1.1$^{3.8}$]undecane
3-(N-ethylaminomethyl)tricyclo[4.3.1.1$^{3.8}$]undecane
$\alpha$-Methyl-1-adamantanemethylamine
$\alpha$-Methyl-3-tricyclo[4.3.1.$^{3,8}$]undecanemethylamine
$\alpha,\alpha$-Dimethyl-1-adamantanemethylamine
$\alpha,\alpha$-Dimethyl-3-tricyclo[4.3.1.$^{3,8}$]undecanemethylamine The compounds of this invention can be prepared by a variety of methods.

1-adamantane carboxylic acid and 3-tricyclo[4.3.1.1$^{3.8}$] undecane carboxylic acid can be converted to the corresponding acid chlorides with thionyl chloride. The unsubstituted amides and a variety of N-alkyl- and N,N-dialkyl-substituted amides can be prepared from the acid chlorides by reaction with the appropriately substituted amines and ammonia. These amides are then reduced with lithium aluminum hydride to the corresponding amino-, N-alkylamino- and N,N-dialkylaminomethyl-adamantanes and -tricycloundecanes.

The $\alpha$-alkyl-1-adamantanemethylamines and $\alpha$-alkyl-3-tricyclo[4.3.1.1$^{3.8}$]undecanemethylamines are prepared by reduction of adamantyl-(1) alkyl ketone oximes and tricyclo[4.3.1.1$^{3.8}$]undecyl-(3) alkyl ketone oximes with lithium aluminum hydride. The ketones from which these oximes are derived are conveniently made by the reaction of the appropriate dialkyl cadmium with 1-adamantoyl chloride or 3-tricyclo[4.3.1.1$^{3.8}$]undecoyl chloride.

The $\alpha,\alpha$-dialkyl-1-adamantanemethylamines and $\alpha,\alpha$-dialkyl-3-tricyclo[4.3.1.1$^{3.8}$]undecanemethylamine are made by the reaction of acetonitrile and sulfuric acid (Ritter reaction) with the corresponding $\alpha,\alpha$-dialkyl-1-adamantanemethanol or $\alpha,\alpha$-dialkyl-3-tricyclo[4.3.1.1$^{3.8}$] undecanemethanol, which gives the N-acetyl-$\alpha,\alpha$-dialkyl-1-adamantanemethylamine or N-acetyl-$\alpha,\alpha$-dialkyl-3-tricyclo[4.3.1.1$^{3.8}$]undecanemethylamine. The amine is obtained by alkaline hydrolysis. The starting alcohols for these reactions are made by the reaction of 1-adamantoyl chloride or 3-tricyclo[4.3.1.1$^{3.8}$]undecoyl chloride with alkyl Grignard reagents.

A variety of amines can be used for the preparation of 1-adamantanecarboxamides and 3-tricyclo[4.3.1.1$^{3.8}$]- undecanecarboxamides, to give a variety of substituent groups on the nitrogen of 1-(aminomethyl)adamantane and 3 - (aminomethyl)tricyclo[4.3.1.1$^{3.8}$]undecane. For example, reactions of the acid chlorides with allylamine and diallylamine give the N-allyl and N,N-diallyl compounds after reduction. Reactions of the acid chlorides with propargylamine and dipropargylamine give the N-propargyl and N,N-dipropargyl compounds after reduction. Reactions with cyclopropylamine, cyclopropylmethylamine and pyrrolidine give the N - cyclopropyl, N-cyclopropylmethyl and pyrrolidino compounds after reduction. Reactions with alkoxyalkylamines give the N-alkoxyalkyl compounds after reduction. Of course, reactions of the acid chlorides with amines having different N-substituents give corresponding N,N - disubstituted amino compounds. For instance, reactions of the acid chlorides with N-allyl-N-methylamine give 1-(N-allyl-N-methylaminomethyl)adamantane and 3-(N - allyl - N - methylaminomethyl)tricyclo[4.3.1.1$^{3.8}$]undecane.

Some substituted alkyl amino compounds are more easily made by other routes. Hydroxyethyl- and bis-hydroxyethyl compounds are made by reaction of the amine with ethylene oxide. N-carbalkoxymethylamino compounds are made by alkylation with alkyl chloroacetate and base. Aminoalkyl-, alkylaminoalkyl-, and dialkylaminoalkyl compounds are made by alkylation with appropriate aminoalkyl halides and base, although they can be made by treating the corresponding hydroxyalkyl compound with a thionyl halide to replace the hydroxyl group with a halogen and then replacing the halogen with the amino, alkylamino, or dialkylamino group by reaction with ammonia or a primary or secondary amine.

In some cases, N-alkyl- and N,N-dialkyl-compounds are easily made by alkylation of 1-(aminomethyl)adamantane and 3 - (aminomethyl)tricyclo[4.3.1.1$^{3.8}$]undecane with alkylating agents (such as alkyl halides), without resorting to reduction of N-alkyl- and N,N-dialkyl-amines.

When the reagents are used in molar amounts, the monoalkylamino compound is generally formed as the major product, whereas greater amounts of the reagents give the dialkylamino compound. This method is not as clean-cut as reduction of the amides which is why it is less preferred. However, it sometimes becomes the method of choice because it involves fewer steps.

Ethylene chloro- and bromo-hydrin, and alkoxyalkyl halides can be used to alkylate the amino nitrogen, to give the hydroxyethyl- and alkoxyalkyl-substitutions. For the reasons just given, these reactions are less preferable than other methods but may be preferred in certain instances, and they illustrate an alternate route to substituted - alkylaminomethyltricyclo[4.3.1.1$^{3.8}$]undecanes and adamantanes by ordinary alkylation with a substituted alkylating reagent.

Reactions of 1-(aminomethyl)adamantane and 3-(aminomethyl)tricyclo[4.3.1.1³·⁸]undecane with aldehydes give the corresponding alkylidene, arylidene or heterocyclicylidene aminomethyladamantanes and aminomethyltricycloundecanes. For instance, reaction of 1-(aminomethyladamantane with formaldehyde gives N - (1-adamantylmethyl)azomethine. Reaction of 3-(aminomethyl)tricyclo[4.3.1.1³·⁸]undecane with benzaldehyde gives 3-(benzylideneaminomethyl)tricyclo[4.3.1.1³·⁸]undecane.

Reactions of 1-(aminomethyl)adamantane or 3-aminomethyl)tricyclo[4.3.1.1³·⁸]undecane or the corresponding 1-(N-alkylaminomethyl) compounds with butyl formate give the formamido-compounds.

Representative of the compounds of this invention are the following compounds and their salts:

1-(N-methylaminomethyl)adamantane
1-(N,N-dimethylaminomethyl)adamantane
1-(N-ethyl-N-methylaminomethyl)adamantane
1-(N,N-diethylaminomethyl)adamantane
1-(N-propylaminomethyl)adamantane
1-(N-methyl-N-propylaminomethyl)adamantane
1-(N-isopropylaminomethyl)adamantane
1-(N-methyl-N-isopropylaminomethyl)adamantane
1-(N,N-diisopropylaminomethyl)adamantane
1-(N-sec-butylaminomethyl)adamantane
1-(N-isobutylaminomethyl)adamantane
1-(N-tert-butylaminomethyl)adamantane
1-(N-hexylaminomethyl)adamantane
1-(N-isoamylaminomethyl)adamantane
1-(N-1-methylpentylaminomethyl)adamantane
1-(N-1,1-dimethylbutylaminomethyl)adamantane
1-(N,N-dihexylaminomethyl)adamantane
1-(N,N-diisohexylaminomethyl)adamantane
1-[N,N-di-(1-methylpentyl)aminomethyl]adamantane
1-[N,N-di-(1,1-dimethylbutyl)aminomethyl]adamantane
1-(N-cyclopropylaminomethyl)adamantane
1-(N,N-di-cyclopropylaminomethyl)adamantane
1-(N-cyclobutylaminomethyl)adamantane
1-(N,N-di-cyclobutylaminomethyl)adamantane
1-(N-cyclopropylmethylaminomethyl)adamantane
1-(N-cyclopropylmethyl-N-methylaminomethyl)adamantane
1-[N,N-di-(2-hydroxyethyl)aminomethyl]adamantane
1-(N-aminomethylaminomethyl)admantane
1-(N-allylaminomethyl)adamantane
1-(N-allyl-N-methylaminomethyl)adamantane
1-(N,N-di-allylaminomethyl)adamantane
1-[N-(hexen-3-yl)aminomethyl]admantane
1-(N-ethyny-N-methylaminomethyl)adamantane
1-(N-propargylaminomethyl)adamantane
1-(N,N-di-propargylaminomethyl)adamantane
1-(N-hydroxymethylaminomethyl)adamantane
1-(N-mehoxymethylaminomethyl)adamantane
1-(N-ethoxymethylaminomethyl)adamantane
1-[N-(2-methoxyethyl)aminomethyl]adamantane
1-[N-(2-hydroxyethyl)aminomethyl]adamantane
1-[N-(2-hydroxyethyl)-N-methylaminomethyl]adamantane
1-[N,N-di-(2-hydroxyethyl)aminoethyl]adamantane
1-(Naminomethylaminomethyl)adamantane
1-(N-aminomethyl-N-methylaminomethyl)adamantane
1-[N-(methylaminomethyl)aminomethyl]adamantane
1-[N-(butylaminomethylaminomethyl]adamantane
1-[N-(isobutylaminomethyl)aminomethyl]adamantane
1-[N-(sec-butylaminomethyl)aminomethyl]adamantane
1-[N-(tert-butylaminomethyl)aminomethyl]adamantane
1-[N-(dimethylaminomethyl)aminomethyl]adamantane
1-[N-(N'-butyl-N'-methylaminomethyl)aminomethyl]adamantane
1-[N-(dibutylaminomethyl)aminomethyl]adamantane
1-[N-(diisobutylaminomethyl)aminomethyl]adamantane
1-N-[di-(1-methylpentyl)aminomethyl]aminomethyl]adamantane
1-[N-(di-tert-butylaminomethyl(aminomethyl]adamantane 1-[N-(6-hydroxyhexyl)aminomethyl]adamantane
1-[N-(3-hydroxyhexyl)aminomethyl]adamantane
1-[N-(6-methoxyhexyl)aminomethyl]adamantane
1-[N-(3-methoxyhexyl)aminomethyl]adamantane
1-[N-(6-ethoxyhexyl)aminoethyl]adamantane
1-[N-(3-ethoxy-2-methylpentyl)aminomethyl]adamantane
1-[N-(2-aminoethyl)aminomethyl]adamantane
1-[N-(2-methylaminoethyl)aminomethyl]adamantane
1-[N-(3-dimethylaminopropyl)aminomethyl]adamantane
1-[N-(2-dimethylaminoethyl)-N-methylaminomethyl]adamantane
1-[N-(6-aminohexyl)aminomethyl]adamantane
1-[N-(1-amino-1-ethylbutyl)aminomethyl]adamantane
1-[N-(6-methylaminohexyl)aminomethyl]adamantane
1-[N-(4-butylaminohexyl)aminomethyl]adamantane
1-[N-(6-isobutylaminohexyl)aminomethyl]adamantane
1-N-[6-(1-methylpentyl)aminohexyl]aminoethyl adamantane
1-[N-(6-tert-butylaminohexyl)aminomethyl]adamantane
1-[N,N-di-(2-diethylaminoethyl)aminoethyl]adamantane
1-[N-(6-dimethylaminohexyl)aminomethyl]adamantane
1-[N-(3-dimethylaminohexyl)aminomethyl]adamantane
1-[N-(6-dibutylaminohexyl)aminomethyl]adamantane
1-[N-(6-diisobutylaminohexyl)aminomethyl]adamantane
1-[N-(6-di-tert-butylaminohexyl)aminomethyl]adamantane
1-[N-(6-di-tert-butylaminohexyl)aminomethyl]adamantane
1-(N-chloroaminomethyl)adamantane
1-(N-chloro-N-methylaminomethyl)adamantane
1-(N-chloro-N-hexylaminomethyl)adamantane
1-(N-bromoaminomethyl)adamantane
1-(N-bromo-N-methylaminomethyl)adamantane
1-(N-bromo-N-hexylaminomethyl)adamantane
1-(formamidomethyl)adamantane
1-(N-methylformamidomethyl)adamantane
1-(N-hexylformamidomethyl)adamantane
N-(1-adamantylmethyl)glycine
N-(1-adamantylmethyl)sarcosine
N-(1-adamantylmethyl)-N-hexylglycine
N-(1-adamantylmethyl)sarcosine, methyl ester
N-(1-adamantylmethyl)-N-hexylglycine, methyl ester
N-(1-adamantylmethyl)glycine, ethyl ester
N-(1-adamantylmethyl)sarcosine, ethyl ester
N-(1-adamantylmethyl)-N-hexylglycine, ethyl ester
1-(benzylideneaminomethyl)adamantane
1-(ethylideneaminomethyl)adamantane
1-(isohexylideneaminomethyl)adamantane
1-(naphthylideneaminomethyl)adamantane
1-(furfurylideneaminomethyl)adamantane
N-(1-adamantylmethyl)aziridine
N-(1-adamantylmethyl)azetidine
N-(1-adamantylmethyl)pyrrolidine
N-(1-adamantylmethyl)piperidine
N-(1-adamantylmethyl)hexamethyleneimine
3-(aminomethyl)tricyclo[4.3.1.1³·⁸]undecane
3-(N-methylaminomethyl)tricyclo[4.3.1.1³·⁸]undecane
3-(N,N-dimethylaminomethyl)tricyclo[4.3.1.1³·⁸]undecane
3-(N-ethyl-N-methylaminomethyl)tricyclo[4.3.1.1³·⁸]undecane
3-(N,N-diethylaminomethyl)tricyclo[4.3.1.1³·⁸]undecane
3-(N-propylaminomethyl)tricyclo[4.3.1.1³·⁸]undecane
3-(N-methyl-N-propylaminomethyl)tricyclo 4.3.1.1³·⁸]undecane
3-(N-isopropylaminomethyl)tricyclo[4.3.1.1³·⁸]undecane
3-(N-methyl-N-isopropylaminomethyl)tricyclo[4.3.1.1³·⁸]undecane
3-(N,N-diisopropylaminomethyl)tricyclo[4.3.1.1³·⁸]undecane
3-(N-sec-butylaminomethyl)tricyclo[4.3.1.1³·⁸]undecane
3-(N-isobutylaminomethyl)tricyclo[4.3.1.1³·⁸]undecane
3-(N-tert-butylaminomethyl)tricyclo[4.3.1.1³·⁸]undecane 3-(N-hexylaminomethyl)tricyclo[4.3.1.1$^{3.8}$]undecane
3-(N-isoamylaminomethyl)tricyclo[4.3.1.1$^{3.8}$]undecane
3-(N-1-methylpentylaminomethyl)tricyclo[4.3.1.1$^{3.8}$]undecane
3-(N-1,1-dimethylbutylaminomethyl)tricyclo[4.3.1.1$^{3.8}$]undecane
3-(N,N-dihexylaminomethyl)tricyclo[4.3.1.1$^{3.8}$]undecane
3-(N,N-diisohexylaminomethyl)tricyclo[4.3.1.1$^{3.8}$]undecane
3-[N,N-di-(1-methylpentyl)aminomethyl]tricyclo[4.3.1.1$^{3.8}$]undecane
3-[N,N-di-(1,1-dimethylbutyl)aminomethyl]tricyclo[4.3.1.1$^{3.8}$]undecane
3-(N-cyclopropylaminomethyl)tricyclo[4.3.1.1$^{3.8}$]undecane
3-(N,N-di-cyclopropylaminomethyl)tricyclo[4.3.1.1$^{3.8}$]undecane
3-(N-cyclobutylaminomethyl)tricyclo[4.3.1.1$^{3.8}$]undecane
3-(N,N-di-cyclobutylaminomethyl)tricyclo[4.3.1.1$^{3.8}$]undecane
3-(N-cyclopropylmethylaminomethyl)tricyclo[4.3.1.1$^{3.8}$]undecane
3-(N-cyclopropylmethyl-N-methylaminomethyl)tricyclo[4.3.1.1$^{3.8}$]undecane
3-(N-cyclobutylmethylaminomethyl)tricyclo[4.3.1.1$^{3.8}$]undecane
3-(N-methyl-N-vinylaminomethyl)tricyclo[4.3.1.1$^{3.8}$]undecane
3-(N-allylaminomethyl)tricyclo[4.3.1.1$^{3.8}$]undecane
3-(N-allyl-N-methylaminomethyl)tricyclo[4.3.1.1$^{3.8}$]undecane
3-(N,N-di-allylaminomethyl)tricyclo[4.3.1.1$^{3.8}$]undecane
3-[N-(hexen-3-yl)aminomethyl]tricyclo[4.3.1.1$^{3.8}$]undecane
3-(N-ethynyl-N-methylaminomethyl)tricyclo[4.3.1.1$^{3.8}$]undecane
3-(N-propargylaminomethyl)tricyclo[4.3.1.1$^{3.8}$]undecane
3-(N,N-di-propargylaminomethyl)tricyclo[4.3.1.1$^{3.8}$]undecane
3-(N-hydroxymethylaminomethyl)tricyclo[4.3.1.1$^{3.8}$]undecane
3-(N-methoxymethylaminomethyl)tricyclo[4.3.1.1$^{3.8}$]undecane
3-(N-ethoxymethylaminomethyl)tricyclo[4.3.1.1$^{3.8}$]undecane
3-[N-(2-methoxyethyl)aminomethyl]tricyclo[4.3.1.1$^{3.8}$]undecane
3-[N-(2-hydroxyethyl)aminomethyl]tricyclo[4.3.1.1$^{3.8}$]undecane
3-[N-(2-hydroxyethyl)-N-methylaminomethyl]tricyclo-[4.3.1.1$^{3.8}$]undecane
3-[N,N-di(2-hydroxyethyl)aminomethyl]tricyclo[4.3.1.1$^{3.8}$]undecane
3-(N-aminomethyl)tricyclo[4.3.1.1$^{3.8}$]undecane
3-(N-aminomethyl-N-methylaminomethyl)tricyclo[4.3.1.1$^{3.8}$]undecane
3-[N-(methylaminomethyl)aminomethyl]tricyclo[4.3.1.1$^{3.8}$]undecane
3-[N-(butylaminomethyl)aminomethyl]tricyclo[4.3.1.1$^{3.8}$]undecane
3-[N-(isobutylaminomethyl)aminomethyl]tricyclo[4.3.1.1$^{3.8}$]undecane
3-[N-(sec-butylaminomethyl)aminomethyl]tricyclo[4.3.1.1$^{3.8}$]undecane
3-[N-(tert-butylaminomethyl)aminomethyl]tricyclo[4.3.1.1$^{3.8}$]undecane
3-[N-(dimethylaminomethyl)aminomethyl]tricyclo[4.3.1.1$^{3.8}$]undecane
3-[N-(N'-butyl-N'-methylaminomethyl)aminomethyl]tricyclo[4.3.1.1$^{3.8}$]undecane
3-[N-dibutylaminomethyl)aminomethyl]tricyclo[4.3.1.1$^{3.8}$]undecane
3-[N-diisobutylaminomethyl)aminomethyl]tricyclo[4.3.1.1$^{3.8}$]undecane
3-N-[di(1-methylpentyl)aminomethyl]aminomethyl tricyclo[4.3.1.1$^{3.8}$]undecane
3-[N-(di-tert-butylaminomethyl)aminomethyl]tricyclo[4.3.1.1$^{3.8}$]undecane
3-[N-(6-hydroxyhexyl)aminomethyl]tricyclo[4.3.1.1$^{3.8}$]undecane
3-[N-(3-hydroxyhexyl)aminomethyl]tricyclo[4.3.1.1$^{3.8}$]undecane
3-[N-(6-methoxyhexyl)aminomethyl]tricyclo[4.3.1.1$^{3.8}$]undecane
3-[N-(3-methoxyhexyl)aminomethyl]tricyclo[4.3.1.1$^{3.8}$]undecane
3-[N-(6-ethoxyhexyl)aminomethyl]tricyclo[4.3.1.1$^{3.8}$]undecane
3-[N-(3-ethoxy-2-methylpentyl)aminomethyl]tricyclo[4.3.1.1$^{3.8}$]undecane
3-[N-(2-aminoethyl)aminomethyl]tricyclo[4.3.1.1$^{3.8}$]undecane
3-[N-(2-methylaminoethyl)aminomethyl]tricyclo[4.3.1.1$^{3.8}$]undecane
3-[N-(3-dimethylaminopropyl)aminomethyl]tricyclo[4.3.1.1$^{3.8}$]undecane
3-[N-(2-dimethylaminoethyl)-N-methylaminomethyl]tricyclo[4.3.1.1$^{3.8}$]undecane
3-[N-(6-aminohexyl)aminomethyl]tricyclo[4.3.1.1$^{3.8}$]undecane
3-[N-(1-amino-1-ethylbutyl)aminomethyl]tricyclo[4.3.1.1$^{3.8}$]undecane
3-[N-(6-methylaminohexyl)aminomethyl]tricyclo[4.3.1.1$^{3.8}$]undecane
3-[N-(4-butylaminohexyl)aminomethyl]tricyclo[4.3.1.1$^{3.8}$]undecane
3-[N-(6-isobutylaminohexyl)aminomethyl]tricyclo[4.3.1.1$^{3.8}$]undecane
3-N-[6-(1-methylpentyl)aminohexyl]aminomethyl tricyclo[4.3.1.1$^{3.8}$]undecane
3-[N-(6-tert-butylaminohexyl)aminomethyl]tricyclo[4.3.1.1$^{3.8}$]undecane
3-[N,N-di-(2-diethylaminoethyl)aminomethyl]tricyclo[4.3.1.1$^{3.8}$]undecane
3-[N-(6-dimethylaminohexyl)aminomethyl]tricyclo[4.3.1.1$^{3.8}$]undecane
3-[N-(3-dimethylaminohexyl)aminomethyl]tricyclo[4.3.1.1$^{3.8}$]undecane
3-[N-(6-dibutylaminohexyl)aminomethyl]tricyclo[4.3.1.1$^{3.8}$]undecane
3-[N-(6-diisobutylaminohexyl)aminomethyl]tricyclo[4.3.1.1$^{3.8}$]undecane
3-[N-(6-di-tert-butylaminohexyl)aminomethyl]tricyclo[4.3.1.1$^{3.8}$]undecane
3-(N-chloroaminomethyl)tricyclo[4.3.1.1$^{3.8}$]undecane
3-(N-chloro-N-methylaminomethyl)tricyclo[4.3.1.1$^{3.8}$]undecane
3-(N-chloro-N-hexylaminomethyl)tricyclo[4.3.1.1$^{3.8}$]undecane
3-(N-chloroaminomethyl)tricyclo[4.3.1.1$^{3.8}$]undecane
3-(N-bromo-N-methylaminomethyl)tricyclo[4.3.1.1$^{3.8}$]undecane
3-(N-bromo-N-hexylaminomethyl)tricyclo[4.3.1.1$^{3.8}$]undecane
3-(formamidomethyl)tricyclo[4.3.1.1$^{3.8}$]undecane
3-(N-methylformamidomethyl)tricyclo[4.3.1.1$^{3.8}$]undecane
3-(N-hexylformamidomethyl)tricyclo[4.3.1.1$^{3.8}$]undecane
N-(3-tricyclo[4.3.1.1$^{3.8}$]undecylmethyl)glycine
N-(3-tricyclo[4.3.1.1$^{3.8}$]undecylmethyl)sarcosine
N-(3-tricyclo[4.3.1.1$^{3.8}$]undecylmethyl)-N-hexylglycine
N-(3-tricyclo[4.3.1.1$^{3.8}$]undecylmethyl)sarcosine, methyl ester
N-(3-tricyclo[4.3.1.1$^{3.8}$]undecylmethyl)-N-hexylglycine, methyl ester N-(3-tricyclo[4.3.1.1³·⁸]undecylmethyl) glycine, ethyl ester
N-(3-tricyclo[4.3.1.1³·⁸]undecylmethyl) sarcosine, ethyl ester
N-(3-tricyclo[4.3.1.1³·⁸]undecylmethyl)- N-hexylglycine, ethyl ester
3-(benzylideneaminomethyl)tricyclo [4.3.1.1³·⁸]undecane
3-(ethylideneaminomethyl)tricyclo [4.3.1.1³·⁸]undecane
3-(isohexylideneaminomethyl)tricyclo [4.3.1.1³·⁸]undecane
3-(naphthylideneaminomethyl)tricyclo [4.3.1.1³·⁸]undecane
3-(furfurylideneaminomethyl)tricyclo [4.3.1.1³·⁸]undecane
N-(3-tricyclo[4.3.1.1³·⁸]undecylmethyl) aziridine
N-(3-tricyclo[4.3.1.1³·⁸]undecylmethyl) azetidine
N-(3-tricyclo[4.3.1.1³·⁸]undecylmethyl) pyrrolidine
N-(3-tricyclo[4.3.1.1³·⁸]undecylmethyl) piperidine
N-(3-tricyclo[4.3.1.1³·⁸]undecylmethyl) hexamethyleneimine Detailed working examples showing the preparation of many of the above compounds and other compounds useful for this invention are disclosed in my Pat. No. 3,352,912. This disclosure and all other disclosures of said patent not expressly set forth herein is hereby incorporated by reference for a more complete understanding of the invention.

As stated above, this invention relates to the method of controlling influenza virus infections in warm-blooded animals.

It will be understood that the term "controlling" influenza virus infections will include the prevention, cure and/or mitigation of said virus infections of warm-blooded animals.

It will be understood that a "warm-blooded animal" is a member of the animal kingdom possessed of a homeostatic mechanism and includes mammals and birds.

The compounds of this invention can be administered in the anti-influenza treatment according to this invention by any means that effects contact of the active ingredient compound with the site of influenza virus infection in the body of a warm-blooded animal. It will be understood that this includes the administration to the site prior to infection setting in as well as after. For example, administration can be parenterally, that is subcutaneously, intravenously, intramuscularly, or intraperitoneally. Alternatively or concurrently, administration can be by the oral route.

The dosage administered will be dependent upon the virus being treated, the age, health and weight of the recipient, the extent of infection, kind of concurrent treatment if any, frequency of treatment, and the nature of the effect desired. Generally, a daily dosage of active ingredient compound will be from about 1 to 50 milligrams per kilogram of body weight, although lower, such as 0.5 milligram, per kilogram or higher amounts can be used. Ordinarily, from 1 to 20 and preferably 1 to 10 milligrams per kilogram per day, in one or more applications per day is effective to obtain the desired result.

When chick embryo and/or calf kidney cells in which each of influenza A/PR8, influenza A/Equine 2/Lexington/3/63, influenza A2/Hong Kong/50/68, influenza A2/Japan/30557, herpes simplex, rubella or rubeola is added 15 minutes after 25 micrograms per milliliter of α-methyl-1-adamantane methylamine hydrochloride has been added said virus strains are found to be sensitive to said α-methyl-1-adamantane methylamine hydrochloride, indicating that the compound is effective in controlling said virus strains.

When α-methyl-1-adamantane methylamine hydrochloride is administered orally at 30 mg./kg. every four hours from ½ hour prior to infection of mice with influenza A/Swine/S15 or influenza A2/AA/2/60 to 23½ hours after infection, infectivity of the mice is markedly reduced. With influenza A/Swine/S15 there was one survivor out of 19 non-treated control animals whereas there were 15 survivors of 20 infected, treated mice. In the case of influenza A2/AA/2/60 infections of mice, the controls showed only three survivors whereas the treated, infected mice showed sixteen survivors out of twenty mice.

Alternatively, administration of α-methyl-1-adamantanemethylamine hydrochloride after infection of mice with influenza virus is also useful in the prevention of disease. Treatment of mice at 4 mg./kg. given orally every 4 hours from 24 hours to 140 hours after infection with influenza A2/AA/2/60 results in 88% survivors and 2 mg./kg. under the same conditions results in 78% survivors. The infected, untreated control animals have 18% survivors.

As a further example of the activity of compounds of the invention, N-methyl-tricyclo(4.3.1³·⁸)undecane-3-methylamine hydrochloride administered by the IP route every 4 hours for 12 doses to mice starting 30 minutes prior to infection of mice with influenza A2/AA/2/60 caused a reduction of infectivity of the virus of 1 log. Under the same conditions with mice infected with influenza A/Swine/S15, the administration of compound resulted in a 0.7-log reduction of virus infectivity.

The active ingredient of this invention can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active ingredient will ordinarily always be present in an amount of at least 0.5% by weight based on the total weight of the composition and not more than 90% by weight.

Besides the active ingredient of this invention the pharmaceutical composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 30–60% by weight of a compound of Formula 1 and 2 and 70–40% of a carrier. In another embodiment, the active ingredient is tableted with or without adjuvants. In yet another embodiment, the active ingredient is put into powder packets and employed. These capsules, tablets and powders will generally constitute from about 5% to about 95% and preferably from 25% to 90% by weight. These dosage forms preferably contain from about 5 to about 500 milligrams of active ingredient, with from about 25 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.5% to 25%, and preferably about 1 to 10% by weight of the active ingredient.

As mentioned above, oral administration can be in a suitable suspension or syrup, in which the active ingredient ordinarily will constitute from about 0.5 to 10%, and preferably about 2 to 5%, by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F.

Cook, a well known reference text in this field.

In addition to the exemplary illustrations above, the following examples further explain the present invention:

EXAMPLE 1

A large number of unit capsules are prepared by filling standard two-piece hard gelatin capsules weighing about 50 milligrams each with 50 milligrams of powdered 1-(aminomethyl)adamantane, hydrochloride, 125 milligrams of lactose and 1 milligram of "Cab-o-sil."

EXAMPLE 2

Example 1 is repated execept that soft gelatin capsules are used and the powdered 1-(aminomethyl)adamantane is first dissolved in mineral oil.

EXAMPLE 3

Example 1 is repeated except that the dosage unit is 50 milligrams of active ingredient, 5 milligrams of gelatin, 1.5 milligrams of magnesium stearate and 100 milligrams of lactose, mixed and formed into a tablet by a conventional tableting machine. Slow release pills or tablets can also be used, by applying appropriate coatings. A sugar coating may be applied to increase palatability.

EXAMPLE 4

A parenteral composition suitable for administration by injection is prepared by stirring 5% by weight of the active ingredient of Example 1 in sterile aqueous 0.9% saline.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin and Cook text mentioned above.

Compounds within the scope of Formulae 1 and 2 of the invention are anti-influenza agents in domestic animals and livestock. As an illustration, compounds within the scope of Formulae 1 and 2 are affective against swine influenza and an embodiment of the invention, therefore, is a control of this infection by incorporating an active ingredient compound in the die of the affected animal. For most purposes, an amount of active compound will be used to provide from about 0.0001% to 0.1% by weight of the active compounds based on the total weight of feed intake. Preferably, from 0.001% to 0.02% by weight will be used.

In like manner novel and useful compositions are provided by this invention which comprise at least one active ingredient compound within the scope of this invention in admixture with an animal feed. Descriptions of suitable feeds can be found in the book "Feeds and Feeding" by Frank B. Morrison, published by the Morrison Publishing Company of Ithaca, N.Y., 1948, 21st edition. The selection of the particular feed is within the knowledge of the art and will depend of course on the animal, the economics, natural materials available, the surrounding circumstances and the nature of the effect desired, as will be readily understood.

A particularly important composition according to this feature of the invention is a concentrate, suitable for preparation and sale to a farmer or livestock grower for addition to the animal's feedstuffs in appropriate proportion. These concentrates ordinarily comprise about 0.5% to about 95% by weight of the active ingredient compound together with a finely divided solid, preferably flours, such as wheat, corn, soya bean and cottonseed. Depending on the recipient animal, the solid adjuvant can be ground cereal, charcoal, Fuller's earth, oyster shell and the like. Finely divided attapulgite and bentonite can be used, these latter materials also acting as solid dispersing agents.

The feed compositions, as fell as the just-described concentrates, can additionally contain other components of feed concentrates or animal feeds, as will be readily understood. Other particularly important additives include proteins, carbohydrates, fats, vitamins, minerals, antibiotics, etc.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

What is claimed is:

1. The method of controlling an influenza A virus infection in a warm-blooded animal comprising administering to said warm-blooded animal an antivirally effective amount of a compound selected from compounds of the formula:

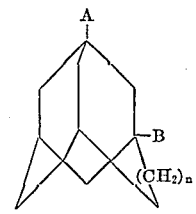

where
$n$ is 0 or 1 with the provisio than when n is 0,
A is

and B is hydrogen, and when $n$ is 1,
B is

and A is hydrogen, and
wherein
X and Y are each hydrogen, methyl, or ethyl; and
R is

where $m$ is an integer of from 2 through 6; —NR$_1$R$_2$; or —N=CHR$_3$
wherein
R$_1$ is hydrogen; alkyl of 1 through 6 carbon atoms; monosubstituted alkyl of 1 through 6 carbon atoms where the substituent is hydroxy, alkoxy of 1 through 2 carbon atoms, —NH$_2$, —NHR$_4$, or —NR$_4$R$_5$ where R$_4$ and R$_5$ are each alkyl of 1 through 4 carbon atoms; alkenyl of 2 through 6 carbon atoms; alkynyl of 2 through 6 carbon atoms; cyclopropyl; cyclobutyl; cyclopropylmethyl; or cyclobutylmethyl;

R$_2$ is R$_1$; chlorine; bromine; formyl; —CH$_2$COOH; —CH$_2$COOCH$_3$; or —CH$_2$COOC$_2$H$_5$ with the proviso that when R$_1$ is alkenyl or alkynyl having the unsaturated bond in the 1-position, R$_2$ is alkyl of 1 through 6 carbon atoms or mono-substituted alkyl of 1 through 6 carbon atoms where the substituent is hydroxy, alkoxy of 1 through 2 carbon atoms, —NH$_2$, —NHR$_3$, or —NR$_4$R$_5$; and R$_3$ is hydrogen, alkyl of 1 through 5 carbon atoms, phenyl, naphthyl or furyl;

and the pharmaceutical acceptable acid-addition salts of said compounds.

2. The method of claim 1 wherein the active compound is selected from compounds of the formula

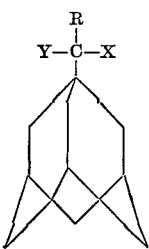

wherein

X and Y are each hydrogen, methyl, or ethyl; and R is

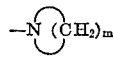

where $m$ is an integer of from 2 through 6; —$NR_1R_2$; or —N=$CHR_3$;
wherein $R_1$ is hydrogen; alkyl of 1 through 6 carbon atoms; mono-substituted alkyl of 1 through 6 carbon atoms where the substituent is hydroxy, alkoxy of 1 through 2 carbon atoms, —$NH_2$, —$NHR_4$, or —$NR_4R_5$ and where $R_4$ and $R_5$ are each alkyl of 1 through 4 carbon atoms; alkenyl of 2 through 6 carbon atoms; alkynyl of 2 through 6 carbon atoms; cyclopropylmethyl or cyclobutylmethyl;

$R_2$ is $R_1$; chlorine; bromine; formyl; —$CH_2COOH$; —$CH_2COOCH_3$; or —$CH_2COOC_2H_5$ with the proviso that when $R_1$ is alkenyl or alkynyl having the unsaturated bond in the 1-position, $R_2$ is alkyl of 1 through 6 carbon atoms or mono-substituted alkyl of 1 through 6 carbon atoms where the substituent is hydroxy, alkoxy of 1 through 2 carbon atoms, —$NH_2$, —$NHR_4$, or —$NR_4R_5$;

$R_3$ is hydrogen, alkyl of 1 through 5 carbon atoms, phenyl, naphthyl or furyl; and the pharmaceutically acceptable acid-addition salts of said compounds.

3. The method of claim 1 wherein said compound is a non-toxic acid addition salt of 1-(aminomethyl)adamantane.

4. The method of claim 1 wherein said compound is a non-toxic acid addition salt of α-methyl-1-adamantane methylamine.

5. The method of claim 1 wherein said compound is a non-toxic acid addition salt of 1-(N-methylaminomethyl)adamantane.

6. A pharmaceutical composition containing from 0.5 to 90% by weight of a compound of the formula

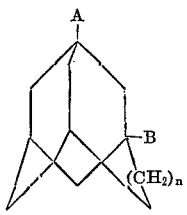

where $n$ is 0 or 1 with the proviso that when $n$ is 0, A is

and B is hydrogen, and when $n$ is 1,
B is

and A is hydrogen, and
wherein

X and Y are each hydrogen, methyl, or ethyl; and R is

where $n$ is an integer of from 2 through 6; —$NR_1R_2$; or —N=$CHR_3$
wherein $R_1$ is hydrogen; alkyl of 1 through 6 carbon atoms; mono-substituted alkyl of 1 through 6 carbon atoms where the substituent is hydroxy, alkoxy of 1 through 2 carbon atoms, —$NH_2$, —$NHR_4$, or —$NR_4R_5$ where $R_4$ and $R_5$ are each alkyl of 1 through 4 carbon atoms; alkenyl of 2 through 6 carbon atoms; alkynyl of 2 through 6 carbon atoms, cyclopropyl; cyclobutyl; cyclopropylmethyl; or cyclobutylmethyl;

$R_2$ is $R_1$; chlorine; bromine; formyl; —$CH_2COOH$; —$CH_2COOCH_3$; or —$CH_2COOC_2H_5$ with the proviso that when $R_1$ is alkenyl or alkynyl having the unsaturated bond in the 1-position, $R_2$ is alkyl of 1 through 6 carbon atoms or mono-substituted alkyl of 1 through 6 carbon atoms where the substituent is hydroxy, alkoxy of 1 through 2 carbon atoms, —$NH_2$, —$NHR_4$, or —$NR_4R_5$; and $R_3$ is hydrogen, alkyl of 1 through 5 carbon atoms, phenyl, naphthyl or furyl;

or a pharmaceutically acceptable acid-addition salt of said compound, and from 99.5 to 10% by weight of a non-toxic pharmaceutical carrier for said compound.

7. The composition of claim 6 wherein the active compound is selected from compounds of the formula of claim 6 where
$n$ is 0,
A is

and
B is hydrogen,
or pharmaceutically acceptable salts of said compounds.

8. The composition of claim 6 wherein said compound is 1-(aminomethyl)adamantane hydrochloride.

9. The composition of claim 6 wherein said compound is α-methyl-1-adamantanemethylamine hydrochloride.

10. The composition of claim 6 wherein said compound is 1-(N-methylaminomethyl)adamantane hydrochloride.

References Cited

Tyrell et al., Brit. J. Exptl. Pathou, vol. XLVI, No. 4 (1965), pp. 370–375.

Andrewes, Viruses of Vertebrates, The Williams and Wilkins Co., Baltimore (1964), pp. 171–180.

Cecil et al., A Text Book of Medicine, Tenth Edition (1959), p. 1 (W. B. Saunders Co., Philadelphia).

JEROME D. GOLDBERG, Primary Examiner

424—244, 267, 274, 285, 330